United States Patent [19]

Werz et al.

[11] 4,153,490
[45] May 8, 1979

[54] METHOD OF MANUFACTURING COATED COMPOSITE ARTICLES FROM A NON-FLOWABLE MIXTURE, AND ARTICLES OBTAINED THEREBY

[75] Inventors: Jakob F. Werz; Edmund E. Munk, both of Oberstenfeld, Fed. Rep. of Germany

[73] Assignee: Werzalit, J. F. Werz Jr. KG Pressholzwerk, Oberstenfeld bei Stuttgart, Fed. Rep. of Germany

[21] Appl. No.: 794,236

[22] Filed: May 5, 1977

[51] Int. Cl.² ............................................. B32B 31/04
[52] U.S. Cl. ................................... 156/85; 156/219; 156/309; 264/112; 264/119; 264/257; 264/260
[58] Field of Search .................... 428/74, 75, 76, 164, 428/165, 171, 326, 436, 172, 212; 264/257, 260, 265, 112, 255, 266, 230, 134, 151, 135, 136, 119; 156/228, 219, 85, 309

[56] References Cited

U.S. PATENT DOCUMENTS

| 3,035,310 | 5/1962 | Sokol et al. ........................... 264/112 |
| 3,373,233 | 3/1968 | Rondun ................................. 264/112 |
| 3,423,267 | 1/1969 | Munk .................................... 264/112 |
| 3,764,645 | 10/1973 | Munk .................................... 264/112 |
| 3,869,326 | 3/1975 | Matzke ................................. 156/219 |
| 3,916,059 | 10/1975 | Malloy et al. ........................ 428/326 |
| 3,928,693 | 12/1975 | Rudloff ................................. 428/74 |

FOREIGN PATENT DOCUMENTS 745651  2/1956  United Kingdom ..................... 428/165

*Primary Examiner*—Stanley S. Silverman
*Attorney, Agent, or Firm*—Michael J. Striker

[57] ABSTRACT

A composite article is obtained by forming a body of a mixture of a fibrous material with a heat-hardening binder, by interposing between the body and a coating layer an intermediate layer having a tear-resistance and stiffness exceeding those of the coating material and impregnated with a resin which softens more slowly than a different resin with which the coating layer is impregnated, and by transforming the assembly of the body with the layers into the final article. During the transformation, the assembly is heated to a temperature at which the binder of the body hardens, and the resin of the intermediate layer softens more slowly than that of the coating layer. The intermediate layer may include asbestos fibers, or it may be a metallic foil or a soda craft paper.

4 Claims, 1 Drawing Figure

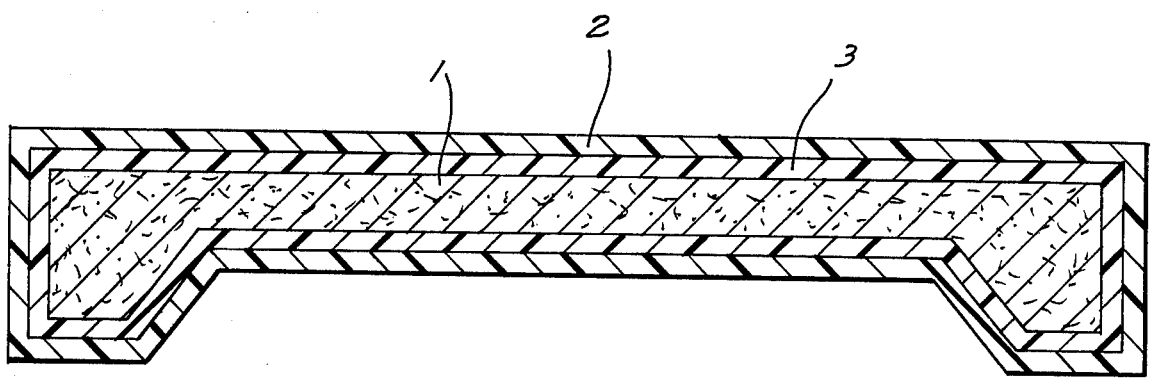

METHOD OF MANUFACTURING COATED COMPOSITE ARTICLES FROM A NON-FLOWABLE MIXTURE, AND ARTICLES OBTAINED THEREBY

BACKGROUND OF THE INVENTION

The present invention relates to a method of manufacturing composite articles in general, and more particularly to such a method as employed in manufacturing articles from a non-flowable mixture, and also to articles obtained by resorting to this method.

There has been already proposed a method of manufacturing composite articles, particularly such which are provided, at least at a predetermined region of the exposed surface thereof, with a decorative coating layer, in which a non-flowable mixture of fibrous material admixed with a heat-hardening binder is pressed in such a manner that, first of all, a preform in made from the mixture by cold pressing, the preform is introduced together with the decorative coating layer or coating layers in a hot press where the mixture which has been previously pressed into the preform hardens during the hot pressing operation performed in the hot press, and simultaneously, the preform is bonded with the decorative coating layer or layers at the above-mentioned region or, when desired all over the exposed surface thereof.

This method is already known and in widespread use, and the materials used and the temperature and pressure conditions to which such materials are subjected are well known and available to those active in this field. Such a method is used for the manufacture of a variety of different profiled composite articles, such as facing elements used in the building industry, for instance, cladding panels, plates or profiled elements used for either internal or external cladding of walls or the like, balcony cladding elements, window sills, table tops and the like.

The non-flowable mixture, most of the time, consists of lignocellulose-containing fibrous materials, such as comminuted and dried wood chips, bagasse fibers and the like, which are admixed with a heat-hardening synthetic plastic resin, such as a melamine resin, urea formaldehyde resin or phenol formaldehyde resin. Instead of the comminuted and dried wood or bagasse fibers, there can also be used fibers of other materials, such as glass fibers steel wool or asbestos fibers, either individually or in a mixture with one another, to which corresponding, preferably organic, binders are added.

The coating layer mostly consists of at least two sub-layers, that is a decorative layer, for example, of a fabric, a veneer, a printed paper sheet or foil or a synthetic plastic material foil, over which there can be applied a transparent protective layer. As the protective layer, there is usually used a clear so-called overlay paper, consisting of a non-filled alpha-cellulose paper or a glass fiber fleece, which is soaked with a thermosetting plastic material, mostly on the melamine basis. The transparent protective layer can also be produced in such a manner that the decorative layer is provided with a thicker resin layer, such as of melamine formaldehyde resin or urea formaldehyde resin.

It will be appreciated that it is desirable and, most of the time, even indispensible, that the coating layer enters into a permanent bond with the exposed surface of the preform in order to, whenever necessary, assure a weather and moisture resistant encapsulation of the profiled body. For the latter reason, and not only for aesthetical reasons, it is necessary that the coating layer be provided over the entire exposed surface of the preform, that is, not only on the major surfaces of the preform, but also on the edges and on the edge zones which enclose an obtuse angle with the major surfaces of the preform. It is also desired, under these conditions, that the coating layer be smooth and flat at such zones.

As already mentioned before, the above-discussed conventional methods of manufacturing composite articles have been proven to be effective, particularly in a series production, for manufacturing composite articles of various shapes. Nevertheless, it could be observed, time and time again, on the finished composite articles, that the coating layer was not absolutely smooth and flat, particularly at the edge zones, but rather contained waves or folds at such zones. This, of course, is rather disadvantageous, particularly where the preform is to be transformed into the final article in such a manner that the entire body obtained from the preform is encapsulated in the coating layer.

SUMMARY OF THE INVENTION

Accordingly, it is an object of the present invention to avoid the above-mentioned disadvantages.

More particularly, it is an object of the present invention to improve the above-discussed method in such a way that the composite articles manufactured thereby do not have the above-discussed drawbacks.

Still more particularly, it is an object of the present invention to develop a method of manufacturing composite articles in which the above mentioned coating layer is smooth over the entire exposed surface of the preform or the body formed therefrom even in the regions of the edge zones of the body.

A yet another object of the present invention is to provide a method of manufacturing composite articles in which the coating layer is connected to the underlying body even at the edge zones of the latter.

A concomitant object of the present invention is to present an article which does not have the imperfections of the composite articles manufactured herebefore.

A further object of the present invention is to manufacture an article the coating layer of which is smooth and flat even at the edge zones of the composite article.

In pursuance of these objects and others which will become apparent hereafter, one feature of the present invention resides, briefly stated, in a method of manufacturing composite articles, which comprises the steps of forming a body having a shape substantially corresponding to that of an article to be manufactured; sandwiching between a coating layer and a predetermined region of said body an intermediate layer having a tearresistance and stiffness which exceed those of said coating layer; and subjecting the sandwiched assembly to such conditions that the same is transformed into a unitary composite article. Preferably, the forming step includes pressing a deformable substance to the above-mentioned shape, the forming step preferably further including admixing a fibrous material with a heat-hardening binder to obtain the deformable substance prior to the pressing of the latter. Advantageously the subjecting step includes heating the sandwiched assembly to a temperature at which the heat hardening binder hardens. The intermediate layer may be advantageously impregnated with a resin which softens only slowly when heated, prior to said sandwiching step. Then, the subjecting step includes elevating the temperature of the sandwiched assembly to above the softening point of the resin. The coating layer may also be impregnated with a different resin, and the resin with which the intermediate layer is impregnated may soften more slowly than the resin of the coating layer when subjected to elevated temperatures. According to a further preferred aspect of the present invention, the subjecting includes compressing the assembly to transform the same into the unitary composite article.

Accordingly, it is proposed according to the present invention to place, before the hot pressing, the above-discussed intermediate layer over the preform, in addition to the decorative coating layer and underneath the same, whereupon the assembly of the preform with the above-mentioned layers is hot pressed. As already known the resin components within and on the coating layers soften during the hot pressing so that the coating layers are capable of being deformed into surface contact, in their softened flowable state, with the surface of the preform and in conformity with the profiled contour thereof, while being simultaneously bonded thereto. During this procedure, the additional intermediate layer, as a result of the fact that the resinous components thereof soften somewhat more slowly than the resinous components of the decorative coating layer, serves as a support for the decorative coating layer, independently of the rate at which the preform shrinks during the hardening thereof, so that the coating layer can flow evenly and, in its final state, constitute a smooth and flat coating layer.

Inasmuch as the decorative coating layers, most of the time, are soaked or coated with melamine formaldehyde resin, it has been established as being advantageous to use for the intermediate layer a layer which is soaked with phenol resins.

A further aspect of the present invention resides in a composite article which includes a body, a coating layer juxtaposed with a predetermined region of the body, and an intermediate layer interposed between the coating layer and the region of the body and having a tear-resistance and stiffness which exceed those of the coating layer. The above-mentioned body may be composed of a mixture of a fibrous material with a heat-hardening binder, while the intermediate layer may contain an impregnating resin which softens only slowly when heated. In such an article, the coating layer may contain a different impregnating resin, and the resin of the intermediate layer may soften more slowly than the resin of the coating layer when subjected to elevated temperatures. Preferably, the intermediate layer includes asbestos fibers, or is a metallic foil or a soda craft paper. The soda craft paper is particularly advantageous for this application inasmuch as it has a high tear-resistance and stiffness.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The FIGURE is a sectional view through a simple article manufactured according to the method of the present invention.

DESCRIPTION OF THE PREFERRED EMBODIMENT

Referring now to the drawing in detail, it may be seen that it represents a cross-sectional view through an article manufactured according to the method of the present invention. As illustrated, the article of the present invention includes a profiled body 1 which is coated with a coating layer 2, an intermediate layer 3 being interposed between the coating layer 2 and the body 1.

In the embodiment illustrated in the sole FIGURE, the layers 2 and 3 cover all of the surfaces of the body 1, constituting a capsule for the latter. However, it is to be understood that this need not be always the case; rather, the layers 2 and 3 may be applied to only some of the exposed surfaces of the body 1. To make the best use of the basic concept of the present invention, however, such selected regions will preferably be at and around the corner zones or edge zones of the article.

The intermediate layer 3 is interposed or sandwiched between the body 1 and the coating layer 2, prior to the final step of hot pressing of the article from the assembly of the body or preform 1 with the layers 2 and 3.

The body 1 is preferably composed of a mixture of wood or bagasse fibers or even other fibers with a heat-hardening binder, preferably organic in nature. The body 1, prior to its assembly with the layers 2 and 3, is formed by a cold-pressing of the mixture of the fibers with the binder in a conventional forming mold, whereupon the layers 2 and 3 are juxtaposed with the body 1 and with one another either prior to or during the introduction of the body 1 into a hot-pressing mold, also of a conventional construction.

The coating layer 2 preferably is decorative in nature and may be made of a fabric, a veneer, a paper foil, a synthetic plastic foil, preferably soaked in melamine formaldehyde resin. On the other hand, the intermediate layer 3 is, for instance, soda craft paper or metallic foil, asbestos fibers or glass fiber fleece soaked in a thermosetting material based on phenol.

The coating layer 2 may consist of two sub-layers of which the outer one is a transparent protective layer which protects the underlying layers or sublayers and also the body 1 from adverse influences of the environment.

Unlike in the prior art described above where the coating layer 2 is directly applied to the body 1, the interposition of the intermediate layer 3 between the same and the body 1 results in avoidance of the formation of creases, wrinkles and corrugations, particularly in the edge regions of the article, due to the fact that, despite the shrinking of the body 1 during the hardening of the binder thereof, the intermediate layer 3 constitutes a support for the coating layer 2 during the deformation of the latter and conforming the same to the profiled contour of the shrinking body 1. This is attributable mainly to the fact that the resin which impregnates the intermediate layer 3 softens more slowly than the resin which impregnates the coating layer 2.

As mentioned previously, the body 1 solidifies during the hot-pressing operation due to the hardening of the heat-hardenable binder thereof while simultaneously shrinking, whereas the layers 2 and 3 are pressed into conformity with the profiled outer contour of the body 1 during the shrinkage of the latter. Here, the intermediate layer 3 serves as a support for the coating layer 2 so that no creasing develops in the latter, even in the corner or edge zones of the body 1. Of course, the heat prevailing applied in the hot mold will soften both layers 2 and 3 but the former to a greater extent than the latter so that the intermediate layer 3 will still be able to support the coating layer 2, while being sufficiently yieldable to conform to the outer contour of the body 1 and be bonded to the body 1, on the one hand, and to the coating layer 2, on the other hand, so that the layers 2 and 3 eventually form a unitary article with the shrunk body 1.

In a currently preferred embodiment of the present invention which has already been tested with excellent results, the thickness of the intermediate layer was between 0.1 and 0.5 mm.

It will be understood that each of the elements described above, or two or more together, may also find a useful application in other types of articles differing from the types described above.

While the invention has been illustrated and described as embodied in a method of manufacturing composite articles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of manufacturing a composite article by bonding a coating layer selected from the group consisting of a fabric, a veneer, a printed paper sheet or foil or a synthetic plastic material foil to a surface of a heat-hardenable body comprising a non-flowable mixture of fibrous material admixed with a heat-hardening binder at a temperature at which the material of the body hardens and concomitantly shrinks and at which the material of the coating layer softens, the improvement comprising the step of uncoupling the coating layer from the body during the shrinkage of the latter by interposing between the coating layer and the surface of the body prior to heating the same to said temperature, an intermediate layer of a material selected from the group consisting of soda craft paper, metallic foil, asbestos fibers and glass fibers fleece which bonds with the coating layer and with the body and which softens at a slower rate than that of the coating layer when heated to said temperature so that, due to the differential softening rates of the layers, the intermediate layer supports the coating layer on the body during the shrinkage of the latter and protects the coating layer from wrinkling resulting from such shrinkage.

2. A method as defined in claim 1; and further comprising the step of compressing the assembly of the layers with the body during the heating thereof to said temperature to transform the assembly into a unitary composite article.

3. A method as defined in claim 1, and further comprising the step of impregnating said intermediate layer with a resin which softens only slowly when heated, prior to said interposing.

4. A method as defined in claim 3 for use with a coating layer impregnated with a different resin; and wherein said impregnating step includes soaking said intermediate layer in said resin which softens more slowly than said different resin when subjected to elevated temperatures.

* * * * *